US007523315B2

(12) United States Patent
Hougaard et al.

(10) Patent No.: US 7,523,315 B2
(45) Date of Patent: Apr. 21, 2009

(54) METHOD AND PROCESS FOR CREATING AN ELECTRONICALLY SIGNED DOCUMENT (75) Inventors: Todd R. Hougaard, Cove, UT (US); Richard S. Andrus, North Logan, UT (US)

(73) Assignee: Ingeo Systems, LLC, Logan, UT (US)

( * ) Notice: Subject to any disclaimer, the term of this patent is extended or adjusted under 35 U.S.C. 154(b) by 717 days.

(21) Appl. No.: 11/018,186

(22) Filed: Dec. 21, 2004

(65) Prior Publication Data

US 2005/0138382 A1   Jun. 23, 2005

Related U.S. Application Data (60) Provisional application No. 60/531,861, filed on Dec. 22, 2003.

(51) Int. Cl.
H04L 9/00 (2006.01)
(52) U.S. Cl. ..................................................... 713/176
(58) Field of Classification Search ................. 713/176, 713/180; 705/62; 283/113; 358/3.28
See application file for complete search history.

(56) References Cited

U.S. PATENT DOCUMENTS

| 5,373,550 | A | 12/1994 | Campbell et al. |
| 5,530,755 | A | 6/1996 | Pailles |
| 5,799,086 | A | 8/1998 | Sudia |
| 5,850,442 | A | 12/1998 | Muftic |
| 5,903,882 | A | 5/1999 | Asay et al. |
| 5,912,974 | A | 6/1999 | Halloway et al. |
| 6,039,248 | A | 3/2000 | Park et al. |
| 6,044,405 | A | 3/2000 | Driscoll et al. |
| 6,047,374 | A | 4/2000 | Barton |
| 6,085,322 | A | 7/2000 | Romney et al. |
| 6,091,835 | A | 7/2000 | Smithies et al. |
| 6,170,744 | B1 | 1/2001 | Lee et al. |
| 6,185,683 | B1 | 2/2001 | Ginter et al. |
| 6,199,052 | B1 | 3/2001 | Mitty et al. |
| 6,209,095 | B1 | 3/2001 | Anderson et al. |

(Continued)

FOREIGN PATENT DOCUMENTS

EP    0676877    10/1995

(Continued)

OTHER PUBLICATIONS

International Search Report and Written Opinion from PCT/US2004/043502, 9 pages, dated Jul. 20, 2007.

(Continued)

Primary Examiner—Emmanuel L Moise
Assistant Examiner—Ali S Abyaneh
(74) Attorney, Agent, or Firm—Workman Nydegger (57) ABSTRACT Electronic signatures valid in printed or scanned form. Electronic signatures are embedded in documents such that the electronic signatures are valid even when the document is scanned, printed or stored in paper form. A document includes a barcode embedded into the document. The barcode includes a unique document ID and a unique signature ID identifying the document and the signer of the document. The document also includes language embedded into the document indicating that the signer of the document authorizes paper versions of the document to be accepted as containing a valid electronic signature.

33 Claims, 8 Drawing Sheets

U.S. PATENT DOCUMENTS

| | | |
|---|---|---|
| 6,253,322 B1 | 6/2001 | Susaki et al. |
| 6,289,460 B1 | 9/2001 | Hajmiragha |
| 6,314,517 B1 | 11/2001 | Moses et al. |
| 6,363,362 B1 | 3/2002 | Burfield et al. |
| 6,367,013 B1 | 4/2002 | Bisbee et al. |
| 6,450,403 B1 | 9/2002 | Martens et al. |
| 6,907,529 B1 * | 6/2005 | Hirose .................. 726/5 |
| 7,028,902 B2 * | 4/2006 | Xu et al. ................ 235/462.1 |
| 7,047,492 B2 * | 5/2006 | Fujiwara .................. 715/255 |
| 7,152,047 B1 * | 12/2006 | Nagel .................. 705/76 |
| 7,191,392 B1 * | 3/2007 | Coar .................. 715/234 |
| 7,194,618 B1 | 3/2007 | Suominen |
| 2001/0002485 A1 | 5/2001 | Bisbee et al. |
| 2001/0047476 A1 | 11/2001 | Yen et al. |
| 2005/0036651 A1 * | 2/2005 | Wen .................. 382/100 |

FOREIGN PATENT DOCUMENTS

JP  2003029629  1/2009

OTHER PUBLICATIONS

Supplemental European Search Report, dated Apr. 16, 2008, 2 pages.

* cited by examiner

METHOD AND PROCESS FOR CREATING AN ELECTRONICALLY SIGNED DOCUMENT

CROSS-REFERENCE TO RELATED APPLICATIONS

This application claims the benefit of U.S. Provisional Application No. 60/531,861, titled "Method And Process For Creating An Electronically Signed Document" filed Dec. 22, 2003, which is incorporated herein by reference.

BACKGROUND OF THE INVENTION

1. The Field of the Invention

The invention relates generally to providing legally recognized signatures. More specifically, the invention relates to generating signatures useful for electronic and paper documents.

2. Description of the Related Art

Signatures are often a formal requirement of various transactions. Many legal instruments, such as wills, contracts, and deeds, are not legally enforceable unless they are signed by the appropriate persons in a specified way. While the specific legal requirements relating to signatures may vary across jurisdictions, the requirement of having a signature on a document serves fundamental purposes. For instance, signatures should be indicative of the person that signed a particular document and signatures should be difficult to reproduce without authorization. Signatures should also identify what is signed such that it is difficult to alter the signed matter without being discovered. Signatures further serve to authenticate a document by identifying each person that signed the document and the act of signing a document is intended to bring the legal aspects of signing the document to the attention of the signer.

The procedures for affixing signatures to paper documents is relatively well established. In the digital realm, however, persons are more reluctant to affix an electronic signature to an electronic document for various reasons even though the characteristics of electronic signatures (such as authenticity and security) are arguably better than their paper counterparts. For example, persons place more trust in paper signatures in comparison to electronic signatures.

When an electronic signature is employed to sign a document, the signer first identifies exactly what is being signed. The document or data identified by the signer is hashed to generate a hash result that is essentially unique to the document. Then, the hash result is converted into an electronic signature using a private key of the signer to encrypt the hash result. In this manner, both the document and the private key are related to the electronic signature.

Transactions involving digitally signed documents usually require a sending party and receiving party to have the ability to digitally send and/or receive documents. This requirement may be met by both parties simply having a computer system connected to a network such as the Ubiquitous Internet and appropriate software.

Often, a party receiving a signed instrument is not equipped to receive electronically signed instruments over a digital connection such as through the Internet. For example, legal or locally mandated requirements may mandate the use of paper copies for signed instruments. One common use for signed documents is recording conveyances and deeds at a county recorder office. In one example, the county recorder may not be equipped to receive documents through a digital connection.

Nonetheless, electronic instrument generation and execution is a cost and time saving operation. As an example of uses of electronically signed instruments, reference is made to U.S. Pat. No. 6,796,489, titled PROCESSING ELECTRONIC DOCUMENTS WITH EMBEDDED DIGITAL SIGNATURES which is incorporated herein by reference in its entirety. It would therefore be useful if electronically signed instruments could be implemented such that a paper copy of an instrument with a valid electronic instrument could be generated.

BRIEF SUMMARY OF THE INVENTION

One embodiment includes a method of signing a document electronically. The electronic signature is such that the document retains the validity of the electronic signature when in paper form. The method includes embedding a barcode in the document. The barcode includes a unique document ID identifying the document and a unique signature ID relating to the signer of the document. The method further includes embedding legal language into the document. The legal language may include text indicating that the signer authorizes paper versions of the document to be accepted as containing a valid electronic signature.

Another embodiment includes a document containing an electronic signature. The signature is valid even when the document is printed or imaged. The document includes a barcode. The barcode includes a unique document ID identifying the document. The barcode further includes a unique signature ID relating to the signer of the document. The document may include language indicating that a signer of the document authorizes paper versions of the document with the barcode to be accepted as containing a valid signature.

Yet another embodiment includes a method of validating a document that includes a barcode signature. The method includes reading the contents of the barcode to obtain a document ID and a signature ID. The method further includes accessing an electronic copy of the document. The electronic copy of the document is compared with the document. The method also includes validating that the electronic copy of the document matches the document.

Advantageously, some embodiments allow for electronic document generation and processing while still allowing for printed and scanned copies of a document to retain legally enforceable electronic signatures. This allows the convenience and efficiency of electronic document processing to be applied to users that accept only paper documents.

These and other advantages and features of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Various legal statues and laws have recently been enacted defining the sufficiency of electronic signatures. For example, the "Electronic Signatures in Global and National Commerce Act, codified as 15 USC §§ 7001-7006 defines electronic thusly: "[t]he term 'electronic' means relating to technology having electrical, digital, magnetic, wireless, optical, electromagnetic, or similar capabilities." Regarding electronic signatures, 15 USC §§ 7001 states that "(1) a signature, contract, or other record relating to such transaction may not be denied legal effect, validity, or enforceability solely because it is in electronic form; and (2) a contract relating to such transaction may not be denied legal effect, validity, or enforceability solely because an electronic signature or electronic record was used in its formation."

Thus, in one embodiment, an electronic signature is implemented by using a barcode as a digital or optical symbol. The barcode may include various pieces of coded information, including a document ID number identifying the particular document with the electronic signature, and a signature ID that is a unique ID number associated with the particular signature. In other embodiments, the barcode may also include an encrypted hash for the document calculated by using a hash algorithm as well as a private key from a (PKI) encryption scheme.

By using a barcode as a signature on a document, the legal requirements are met for a valid signature, even when the document is scanned, printed or stored in paper form. This allows efficiency of electronic document generation to be used while still allowing individuals or entities that are not equipped to receive and/or process documents from a digital network to receive electronically generated documents.

Figure 1:
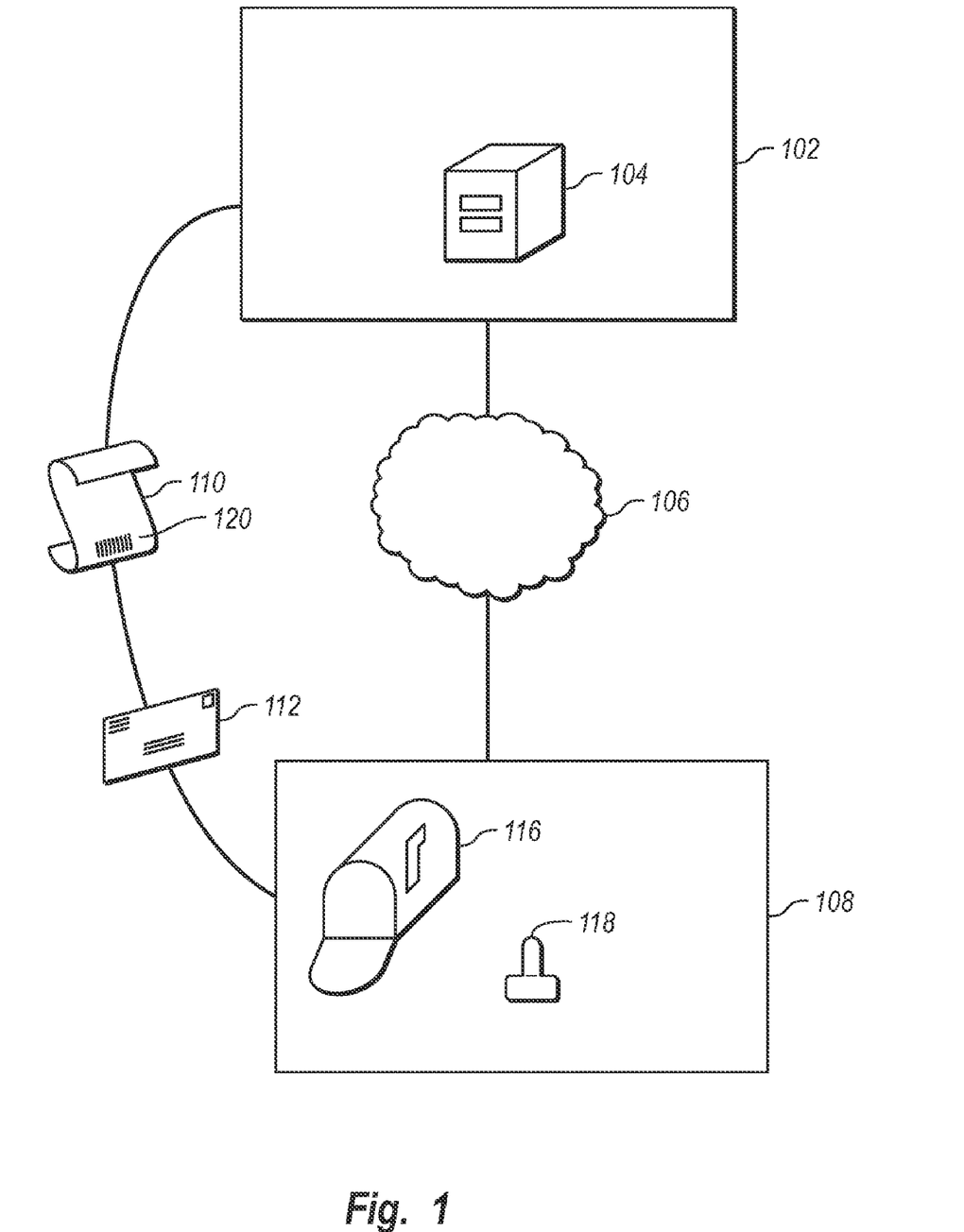
FIG. 1 illustrates a typical topology where embodiments of the invention may be practiced.

Referring now to FIG. 1, one example of an environment where various embodiments may be implemented is shown. As shown in FIG. 1, a document service provider 102 maintains a document server 104. While the document server 104 is shown as a single server, in alternate embodiments, several servers or other computer hardware may be used to perform the functionality of the document server 104. The document server 104 can transmit documents through a network 106 to a recipient 108. Alternatively, the document server 104 may direct the preparation of a paper copy of the document 110 which may be sent as a part of an actual piece of mail 112 to the recipient 108. The recipient 108 receives the mail 112 in a physical mailbox 116.

As shown in FIG. 1, the document 110 includes a barcode 120. The barcode 120 may be scanned using a barcode scanner 118 in possession of the recipient 108. The barcode 120 may include any one of the unique document ID, a unique signature ID, a "reference" certificate which is a standard PKI public key certificate or information referencing or relating to that certificate, an encrypted hash, and a uniform resource locator (URL) referencing a document on the document server 104.

The document server 104 includes functionality to help a recipient of the document 110 to assure themselves that the document 110 is authentic and that all signatures affixed to the document 110 are authentic. Some of the functionality includes, storing a digital copy of documents with signatures on the document server 104, and calculating a hash using a private key where the hash is embedded into the document, such as in the barcode 120, that can be compared with a value stored at the document server 104.

By storing a digital copy of the document 110 at the document server 104, a user can access the copy of the document 110 and compare it to the document 110, whether received through the network 106 or by other means such as through mail 112. In one embodiment, the barcode 120 includes an embedded URL with an address that references a location on the document server 104 where a copy of the document 110 is stored. By scanning the barcode 120 with a barcode scanner 118, the URL can be deciphered and followed to the copy of the document 110. A user can then assure themselves that the document 110 that they are in possession of matches a copy of the document 110 as generated by the service provider 102.

When the document 110 is received through the network 106 or when the document 110 is scanned into a digital image form, one embodiment of the invention provides overlay functionality. One view of the document on the document server 102 is a transparency view. In this way, the transparency view of the document can be overlaid on the scanned or electronically received document to do a direct physical comparison by displaying both images simultaneously.

The document 110 may further contain an encrypted hash calculated from a private key of a PKI encryption scheme. The encrypted hash functions as a tamper seal to help ensure that a document 110 has not been altered or forged. In one embodiment, the encrypted hash is calculated from a private system key used by the document server 104 or the service provider 102. In PKI encryption schemes, a private key and a public key are used. The private key is kept secret while the public key is made available publicly. The owner of the private key uses the private key to generate a value, i.e. an encrypted hash, which is a function of the private key and the information in the document 110. Using the public key, the encrypted hash can be verified by further calculations.

It can be appreciated that often documents may contain a number of signatures. Thus, in one embodiment, the document server 104 maintains copies of a document 110 at various stages of signing.

Figure 2:
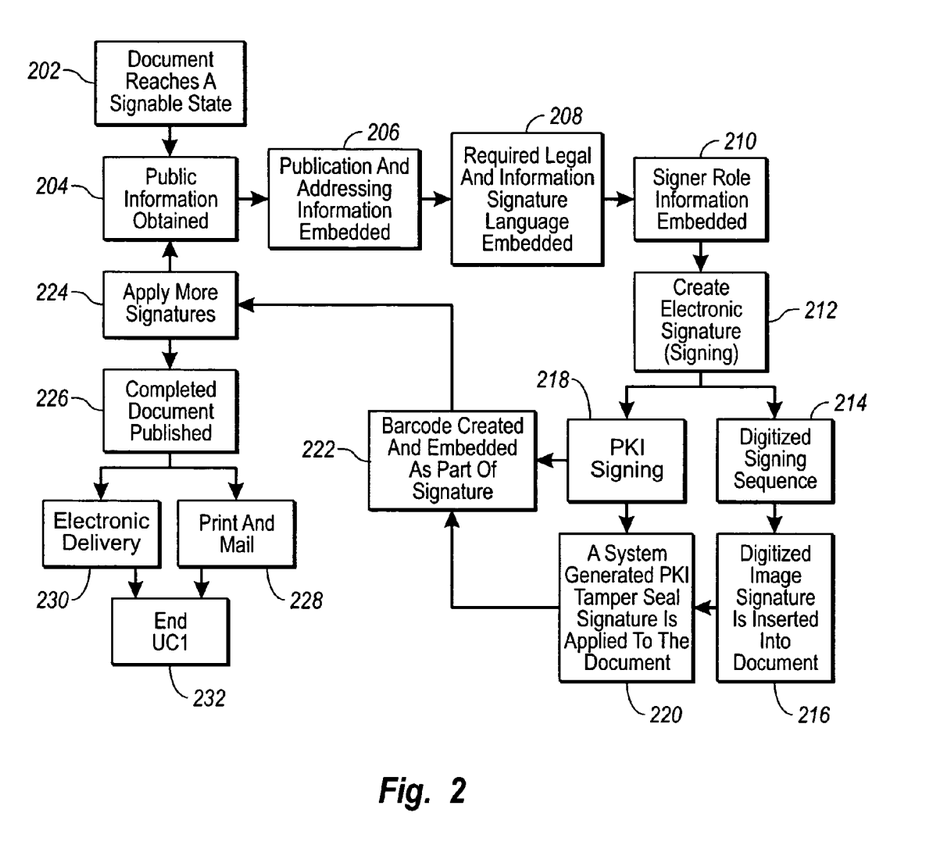
FIG. 2 illustrates a method of signing an electronic document.

Referring now to FIG. 2, a Use Case 1 is illustrated for one embodiment. The Use Case in FIG. 2 illustrates embedding signatures including barcodes into a document. At 202, a document reaches a signable state. A document in a signable state may be, for example, an XML document, an HTML document, an image, or an image with an accompanying XML document. A document is in a signable state when the document has its final look-and feel and when legal language and fill-in information is complete. Documents may be made and formed into a signable state in several ways. For example, a document may be imaged along with importing any appropriate data. Alternatively, electronic document tools provided by the service provider 102 (FIG. 1) may be used to process a document to a signable state.

At 204, electronic publication location information is obtained. At this stage, the document is registered with a publication service such as the service provider 102. A location may reference a server where the document is electronically published, such as the document server 104 (FIG. 1). A URL may be provided by the service provider. At 206 the URL may be embedded in the document, such as in XML or as part of a viewable hyperlink. The URL allows a recipient of the document to verify the authenticity of the document. By following the URL reference, the recipient can verify that the document in their physical possession matches the document that was electronically signed. Embedding the URL in the document may serve two functions, namely: First to protect the URL with a tamper seal thus giving legally binding status to the electronic publication location. The legally binding effect makes the embedded location a part of the agreement. Second, as described above, a recipient can use the tamper seal functionality to verify the consistency of the document in their possession against the document that was signed. Thus, when an entity signs a document with the electronic publication location, the entity is essentially making a legal statement that the document that is being signed matches the one stored at the electronic publication location.

At 208, required legal and informational signature language is embedded into the document. 15 USC and other statues require notification and informational statements regarding the effect of electronic signatures. For example, 15 USC § 7001 discusses various notices that need to be provided to individuals signing documents electronically. Thus, at 208, any required language may be embedded in the document to comply with any legal notice requirement. The informational signature language may, in this example include language indicating that a signer authorizes paper versions of the document to be accepted as containing a valid electronic signature. The language may also indicate that the document is electronically signed and that the purpose of embedding a barcode in the document is to preserve the electronic signature when the document is printed or imaged. Thus, the signer authorizes any paper or imaged versions of the barcode to be considered a valid signature.

At 210, signer role information is embedded into the document. The signer role information relates to the capacity in which a signer signs a document. For example, if the signer is a notary public, the signer role information may include a notary seal and commission information. For a county recorder the signer role information may include a recorder endorsement block. Other signer role information may be embedded into the document. The signer role information may be embedded into the document in a number of ways. For example, if the document is an XML and/or HTML document, the signer role information may be embedded as text. When the document is an image and associated XML, a graphic with the signer role information may be added. Alternatively, text may be overlaid on the image.

At 212, an electronic signature is created. In one embodiment, creating an electronic signature includes three acts including (1) tying the identity of the signer to the document, (2) tamper sealing the document, and (3) embedding a barcode into the document. Each of these three acts is under the control of the signer, as the signer, when executing the signature, authorizes a system to perform the acts.

Two alternatives for tying the identity of the signer to the document are illustrated in 214 and 218. At 214, a digitized signing sequence is shown. In this example, a graphic of an individual's handwritten signature is embedded into the document. The graphic may be for example a scan of an actual signature. The scan is stored in the system for use when an individual electronically signs documents. As shown at 216, a digitized image is inserted into the document. The digitized image may be place in a location specified by a signer, a default location, or a location specified by a business rule. When business rules are used to place the signature, batch signing may be accomplished so as to enable signing a large number of documents in a short period of time.

As an alternative to the digitized signing sequence at 214, a PKI signing sequence at 218, including a PKI signing sequence signature block is embedded into the document. In this embodiment, signers have their own personal private key. Thus, instead of using a graphic, the signer applies a PKI signature to the document. As part of the PKI signing sequence, the document is hashed. That hash is encrypted with the private key of the signer. The encrypted hash is then embedded into the document.

Tamper sealing the document, in the embodiment where a digitized signing sequence is used, such as is shown at 214, is used, is illustrated at 220. In this embodiment, a system generated PKI tamper seal signature is applied to the document. A system private key may be used. After the digitized image is inserted into the document at 216, the document is hashed. The resultant hash is encrypted with the private key of the system and then the encrypted hash is embedded into the document. In one embodiment, tamper sealing is performed on the document prior to inserting the barcode. This may be done so that the encrypted hash can be included as a part of the barcode. Thus, when a recipient of the document attempts to validate the document, as discussed in more detail below, the barcode should be removed before hashing the received document to validate any encrypted hash signatures on the document.

No further tamper sealing such as 220 needs to be performed when a PKI signing sequence such at 218 is used. The PKI signature of the signer acts as both a signing step and an application of a tamper seal.

At 222, a barcode is created and embedded as part of the signature. In one embodiment, placing the barcode in the document is a non-visual process that happens during the application of the electronic signature. Placing the barcode in the document is under the control of the signer. In one embodiment, the barcode is a 2 dimensional barcode so as to increase the amount of information that can be stored in the barcode. As discussed previously herein, the barcode may include an encrypted hash of a PKI signature or PKI tamper seal, a URL to a document location, a certificate ID, a unique document ID, and any other desired data. The PKI signature or tamper seal may use base 64 encoding or other binary encoding types. The certificate ID is used to certify the private key used to PKI tamper seal the document.

The barcode may show as a graphic on the face of the digital version of the document. Additionally, the barcode may by hyperlinked such that it acts as a live clickable link to a location on a document server where a copy of the document is stored.

Often documents need to be signed or endorsed by multiple parties. Thus, at 224 a check can be made to determine if additional signatures are needed. If additional signatures are needed, the steps, beginning at 204 are repeated as shown in FIG. 2 until all necessary signatures have been added.

When all of the necessary signatures have been obtained, the completed document is published as shown at 226. The document server is updated with the latest document version number. The document may now be publicly available on the document server. The document on the document server includes all of the necessary information such that a copy can be displayed and compared with a document received by a recipient. Following the URL link in the document, whether selected from a link digitally in the document, hand keyed into a terminal from a textual link in the document, or read from the barcode, will result in the fully signed document, including the barcode, being displayed. The document server may further include functionality to validate the encrypted hash for a recipient.

At 228 and 230, the document is delivered to a recipient. This may be accomplished, for example, by providing either a paper document 228 or a digitally delivered document 230. In one embodiment, a paper copy may be printed and mailed to a recipient 228. In embodiments where document can be received through electronic channels, the document may be delivered electronically 230. The process shown in FIG. 2 ends at 232.

Figure 3:
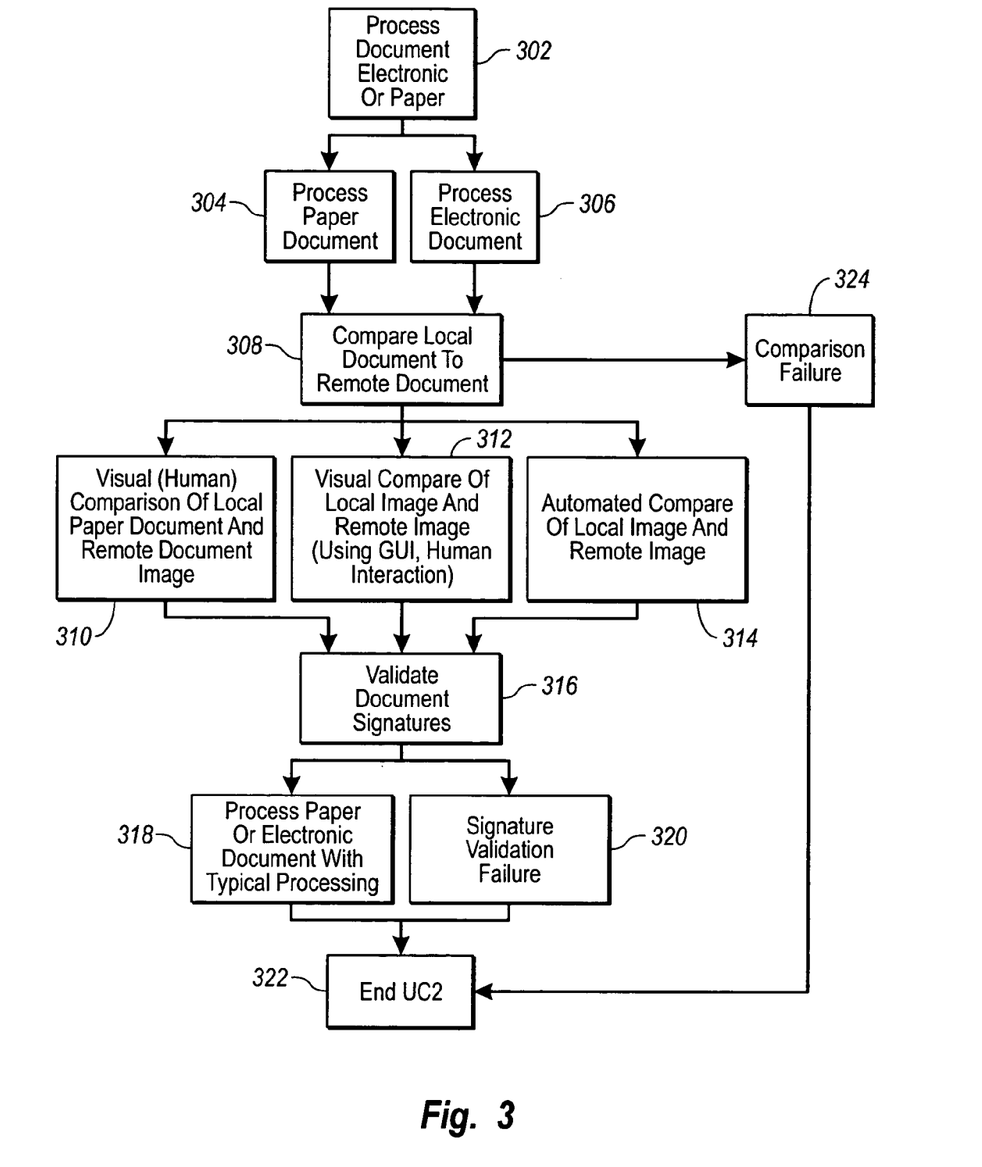
FIG. 3 illustrates a method of validating an electronic document.

Referring now to FIG. 3, a Use Case 2 is shown illustrating validation and data capture from an electronically signed document that has been printed out. As illustrated at 302, a document may be processed by processing a paper document as shown at 304 or by processing an electronic document as shown at 306.

Verification of a paper print out of an electronically signed document is illustrated at 304. To validate the document, a recipient may: (1) hand-key a URL shown on the face of the document, (2) scan the barcode with a manual barcode reader, (3) feed the document into a scanner, or (4) bypass validation against documents on the document server.

A recipient can hand-key a URL that appears on the face of the document into a terminal. The URL may have been added to the document as a part of the signing process shown in FIG. 2. The URL contains a link to a location where an electronic copy of a document is stored on a document server. The recipient can then compare the document on the documentation server to the paper copy they have in hand to assure themselves that they are in possession of a true and accurate copy of the document as signed.

A recipient can scan the barcode with a manual barcode reader. The barcode reader can decode data from the barcode. The data, as described previously, may include a URL to the document server such that an electronic version of the document can be retrieved.

A recipient can feed a received document into a scanner. Using a tray-feeder scanner, processing the document to verify the document may be automated. Using optical character recognition (OCR) and barcode recognition, a system will have data from the barcode including a URL to the document server. This allows the system to retrieve the electronic copy of the document from the document server.

A recipient need not validate the document against an electronic copy of the document. For example, the recipient may trust the source from which the paper copy was received. In this case, the recipient can simply accept the document, including signature and barcode, as a valid and authentic document.

Processing is shown at 306 when the document is delivered electronically. In this case, a barcode signed document is digitally delivered. No paper copy is delivered. In this example, the document arrives with live hyperlinks on the barcode that refer to the publication location on the document server. Alternatively, the text URL may be a live hyperlink or extractable via XML. Thus, processing the document can occur in several ways including, human interaction where a user clicks on a hyperlink (either the barcode or the text URL) or automatic processing by reading the URL from the XML.

Once a received document has been processed, whether in electronic or paper form, the received document can be compared with a copy of the document on the document server as is shown at 308. Comparing the received document with the document at the document server includes validating that the barcode data in the received document matches the barcode data on the copy of the document at the document server. The recipient should perform a domain validation or SSL check on the website at the document server to ensure that the IP address of the publication service is not being spoofed by someone who has created false documents. Several items can be compared on the received document and the document at the document server. The received document can be compared to a copy of the document just before it was signed. The received document may be compared to a copy on the document server in a completed signed state. Additionally, HTML and XML, hashes, signature data, tamper seal data relating to the document and the like may be compared on the received document to the documents stored on the document server. Images on the received a document can be compared to images on the documents stored on the document server. HTML views or PDF views may be compared between the received document and the documents stored on the document server. XML translations, such as PRIA, Minnesota State Recording XML, PRIA indexed format, and the like may be compared between the received document and the document stored on the documents server. Payment information may be compared between the received document and the documents stored on the documents server.

As discussed previously herein, a human recipient, i.e. a natural person, can do a visual comparison of a local paper version of the document with the copy of the documents stored on the document server such as is shown at 310. In this example, the natural person performs a comparison of the two documents until they are satisfied that the documents are the same. The document stored on the document server may be presented in various forms to the recipients until the recipient is satisfied that their local paper document is the same as the document stored on the document server.

Alternatively, a visual comparison by a human may be done when the document is stored electronically on a recipient's computer system as shown at 312. The recipient compares the two documents until the recipient is satisfied that the documents are the same. The documents may be presented in various forms to the recipients until the recipient is satisfied that the received document is the same as the document stored on the document server. When the documents are compared using a recipient's computer system, the documents may be compared in one example by comparing the documents in a side-by-side comparison with the images presented next to each other.

In an alternate embodiment, one of the images, such as the image of the document stored on the documents server, may be visually rendered such that one of the images can be overlaid over the other image. Thus, any discrepancies will be readily apparent to the natural person when the image of the received document does not match the image of the documents stored at the document server. For example, in one embodiment, an overlay function may be called where a scanned version of the document is overlaid on an image of the document from the document server. Any discrepancies may then be highlighted using contrasting colors or other indicators. Alternatively, the scanned version of the document may be associated with handles that allow the scanned version to be dragged, rotated, stretched, and the like so as to allow a manual overlay over the copy of the document stored at the image server. By including handles, differences in scan position or resolution can be compensated for. Contrasting colors or other highlighters may also be used.

In yet another alternative embodiment shown at 314, an automated comparison of the received document and the documents stored on the document server may be performed. An automated comparison could compare a received document, whether scanned or received electronically, to a document stored at the document server using image comparison algorithms and statistically produce a confidence rating as to the degree of confidence one should have that the two documents are the same document.

Referring now to 316, validating document signatures is shown. Validation includes, for example, inspection of a tamper seal. A tamper seal in one embodiment may be an encrypted hash. In one embodiment the signature can be validated by comparing the encrypted hash information in the documents stored on the document server. The document server performs a validation of the document stored at the document server and provides an encrypted hash. The encrypted hash is decrypted and compared to a hash of the received document.

Alternatively the documents stored on the document server may be compared to the received document based on information stored in the barcode. In this example, the encrypted hash is taken from the barcode of the received document and is sent to the service provider along with a reference, such as a URL, referencing the copy of the document stored on the document server. The service provider decrypts the encrypted hash and compares it to a fresh hash of the document on the document server. The validation results are then returned from the service provider to the recipient.

As discussed previously there may be a need to remove the barcode from the document prior to validation of the tamper seal. This is because often the tamper seal is a function of the document without the barcode and thus to replicate a fresh hash that is part of the tamper seal the barcode should be removed.

Processing of a paper document or electronic document is shown at 318 after the signature on the document has been successfully validated. Processing of the document may proceed with a reasonable confidence that the document is properly signed and authentic. Paper copies of the document may be processed using any pre-existing document processing methods. Electronic documents may also be processed using any pre-existing electronic document processing methods such as for example the methods described in U.S. Pat. No. 6,796,489, titled PROCESSING ELECTRONIC DOCUMENTS WITH EMBEDDED DIGITAL SIGNATURES which is incorporated herein by reference in its entirety.

If the process to validate the document results in a failure to validate the document, 325, the process ends at 322 and the received document is not processed or treated as authentic. Similarly, when validation of the signature fails 320, an appropriate notice may be given, the process ends at 322, and the document is not processed.

Figure 4:
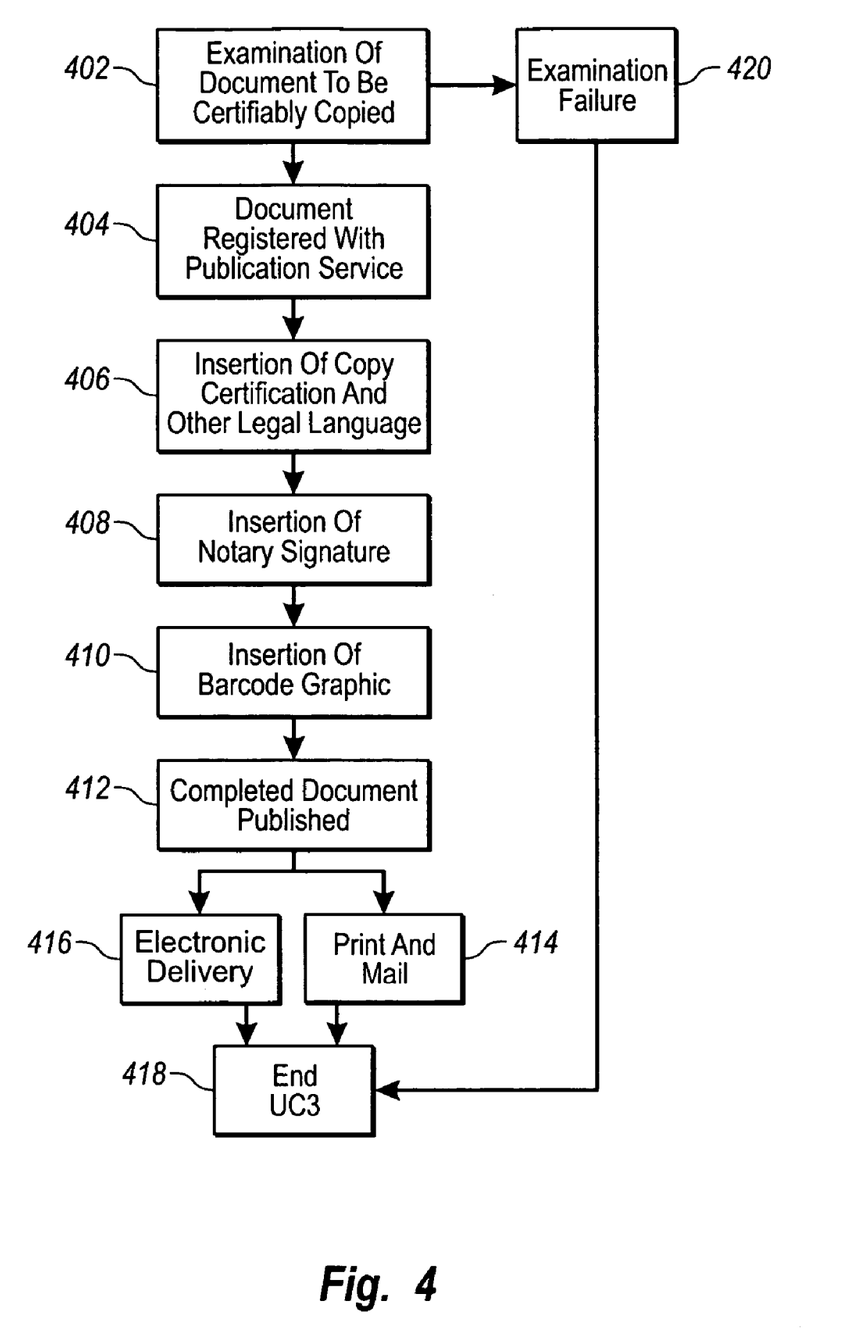
FIG. 4 illustrates a method of creating a certified copy of a document.

Referring now FIG. 4, a Use Case 3 is shown where a notary signed certified electronic document copy is created. This example illustrates how a barcode based signature can be used by a notary to make an electronic certified copy of a document image. In this example, signing and notarization occurs in the standard way, such as by a paper document receiving ink signatures and notarizations.

In Use Case 3 illustrated in FIG. 4, a notary certifies that an image of a document is a true and correct copy of a paper document. This certification is accomplished such that if the image of the document is printed out, the certification is valid and can be validated even on the printed copy.

At 402, a notary examines a document to be certifiably copied. The document is fully and properly executed. The document may also include for example a notary seal and signature. This fully executed document is examined by the notary. Examination of the document may include examining a scanned copy of the document. The scanned copy would be a copy of the paper document. The scanned copy is examined at the time the copy is to be certified. If scanning was done previously, the scanned copy may be retrieved from a trusted source. Thus in one example, an image-based display of the document, without accompanying HTML or XML, as is typical in electronic documents, may be needed.

Alternatively, the document to be certifiably copied may include HTML, XML and/or ERML. In this example, the document may have never been a paper document, but rather was an electronically signed HTML or XML document with electronic signatures and notarizations. The notary certifying the copy validates for themselves that the document is an original so that it can be certified. The notary may perform a PKI signature validation of any PKI signatures. If examination of the document fails, then Use Case 3 ends at 420 and the copy of the document is not certified.

At 404, a document is registered with a publication service, such as service provider. Once the notary has approved an electronic version of a document to be a certified copy of an original, the notary will apply a notarial style barcode signature to the electronic document to certify it as a copy. Applying a notarial style barcode follows the procedures similar to that outlined in Use Case 1 described above in conjunction with the description of FIG. 2. In particular, as described at 210 in FIG. 2, notarial information is embedded including a notary seal and a notary oath. For example, the document will be registered with a service provider and the associated URLs returned from the service provider. An address describing the documents location on a document server is provided an embedded into the document. This may include embedding a viewable URL. Attention is directed to Use Case 1 described in FIG. 2 for further details regarding this aspect.

When the document is an image, the URL may be embedded into the document as part of the image. For example, the URL may be embedded onto the original image using an overlay. When the document is an XML or HTML document, the address of the document on the document server maybe embedded as both HTML and XML so as to make the address both viewable and "data retrievable".

Referring now to 406, insertion of copy certification and other legal language is added to the copy. Depending on local requirements, either a notary certified copy or jurat will be executed. The appropriate markings for the jurisdiction will be inserted either as an overlay of the image or as HTML and XML insertions. In the example where an embedded copy certification is added to the document, the notary embeds certified copy text that is state specific. In the example where a jurat is used, a sworn statement is included, a signature is included, and a notarization of the signature is included. In one embodiment, any sort of electronic signature could be included by the signer along with the sworn statement. The notarization of the signature may be a barcode based electronic signature. With the barcode based signature should also be a statement regarding the nature of the barcode as an electronic signature. This language has been previously described herein at 208 in FIG. 2. This language may be inserted in either as an overlay onto an image and/or as HTML and XML depending on the nature of the copy being certified.

At 408, insertion of the notary signature is shown. In this case, an electronic signature is placed onto an image in a fashion similar to that described in the Use Case 1 in FIG. 2 at 210 and 212. The appropriate notary information as described above in 210 will also be inserted. This information may include a notary seal, commission, expiration of commission, etc. An image may be inserted using overlays as described previously herein. A PKI signature or tamper seal may be used for the certified copy and enables validation from the service provider at a later time. PKI signatures or tamper seals may be used regardless of whether the certified copy is an image or an HTML and XML document.

At 410, insertion of the barcode graphic is shown. The barcode will be embedded into the image using a technique similar to that shown in FIG. 2. The barcode may include an encrypted hash either created against the HTML and XML or against the document image. The encrypted hash may be created either using a user's private key or from a system's private key, depending on whether a signature or a tamper seal is used. This encrypted hash enables validation later such as is described in Use Case 1 described in FIG. 3. The barcode may be included as part of the notary signature and copy certification. Alternatively a separate page could be added to the document containing the certification text and signature. When the document copy being certified is an image, the barcode graphic may be overlaid onto the image. When the document copy being certified is an XML and HTML document a graphic may be inserted and hyperlinks to an address on the document server may also be included.

At 412, a completed document is published. A document server is updated with the latest document version so as to enable the publication of the electronic copy of the document for paper based validation.

At 414 and 416, the document is delivered. In one embodiment, the document is printed and mailed to a destination that uses paper copies such as is shown at 414. Alternatively, electronic delivery may be used where the document is delivered electronically to a destination for electronic processing such as is shown at 416. Use Case 3 ends at 418.

Figure 5:
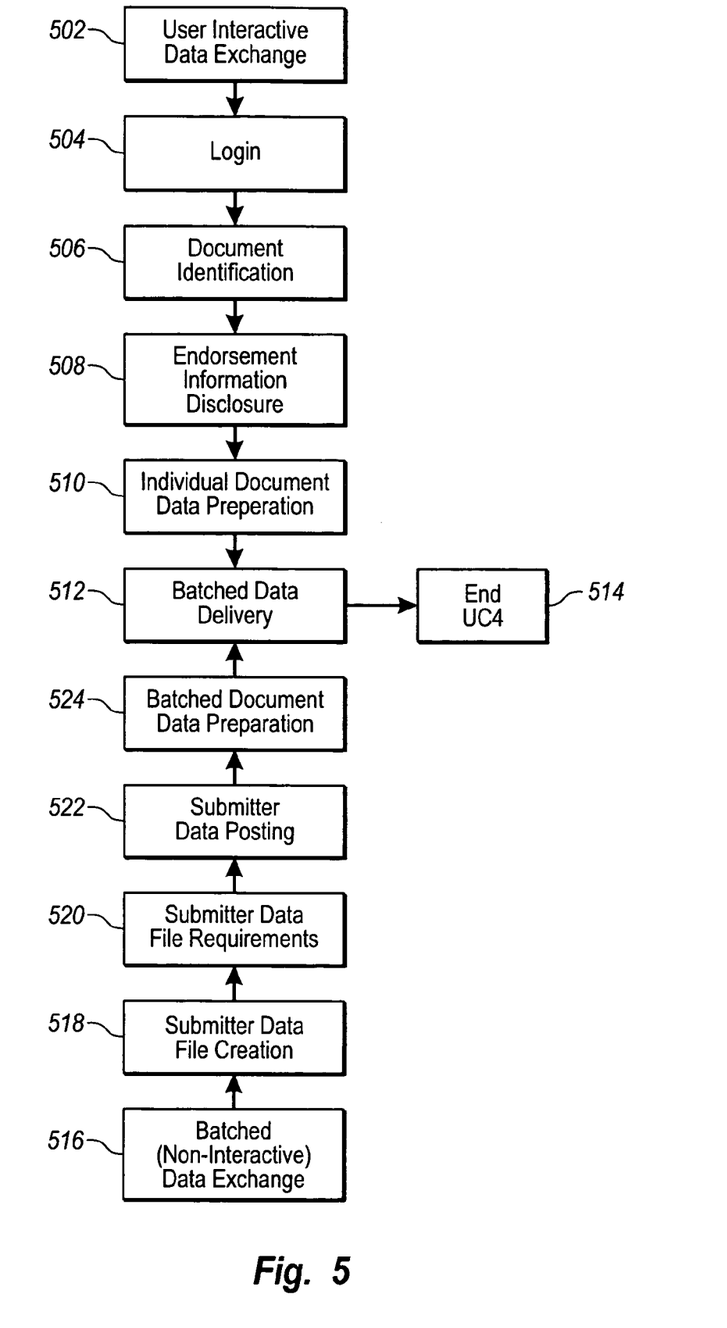
FIG. 5 illustrates a method of retrieving data about a document.

Referring now to FIG. 5, Use Case 4 illustrates exchanging data, including recording data, with a service provider. This Use Case demonstrates how using a paper based version of the document containing barcode electronic signatures can be used for exchanging data about those documents with a service provider. For example, in one embodiment a recipient may provide to the service provider information that the service provider does not have such as an endorsement or other additions to the document. The service provider can provide the recipient, or holder, of the paper document with XML data about the document.

At 502, an example of a user interactive data exchange is shown. This type of data exchange allows a human user to interact with the service provider. At 504, the user logs into the service provider such as by logging into a document server. The user then identifies the paper document in their possession using a unique ID encoded in the barcode as shown at 506. This may be done either by scanning the paper document with a barcode reader or by keying in the unique document ID manually. At 508, the user keys in information that they may have about the document which the document server may not have. For example, if a recorder has recorded and endorsed a document, the user could provide entry book page data, date, etc. At 510 the service provider may send data to the user about this document. For example, if the document is a recording document, indexing information, grantors, grantees, and so forth maybe extracted and delivered to the county recorder immediately from a web based interface. Alternatively, the information may be queued up for delivery to a county recorder or user as a batch at a later time. Batch delivery is illustrated in 512. A batch may be delivered at a specified time such that data for all properly requested documents is transmitted to a user's location.

Use Case 4 also illustrates a non interactive batch data exchange at 516. At 518 a user data file is created. At this stage a user runs a batch to create a data file containing the data to be delivered to the service provider. The data to be delivered may include data for one or more signed paper documents. For example, endorsement data from a batch of documents that have been recorded may be included in the batch. The file being sent to the service provider as shown at 520 includes a unique document ID that may be a part of the barcode. The file may also include any expected information such as the recorders endorsement information. An XML schema may be used to instruct a user how to create a batch to an XML file for submitting this information to the service provider. At 522 the data file from the user is posted to a specified location at the service provider. At 524 the batched document data is prepared. For example, data related to the document, such as the indexing information, grantors, grantees, etc., is extracted from the service provider and queued up for delivery to the user as a batch at an appropriate time. Alternatively the data may be delivered to the user immediately after the data is queued up for delivery to the user. Data is delivered to the user at 512 as discussed above. Use Case 4 ends at 514.

Figure 6:
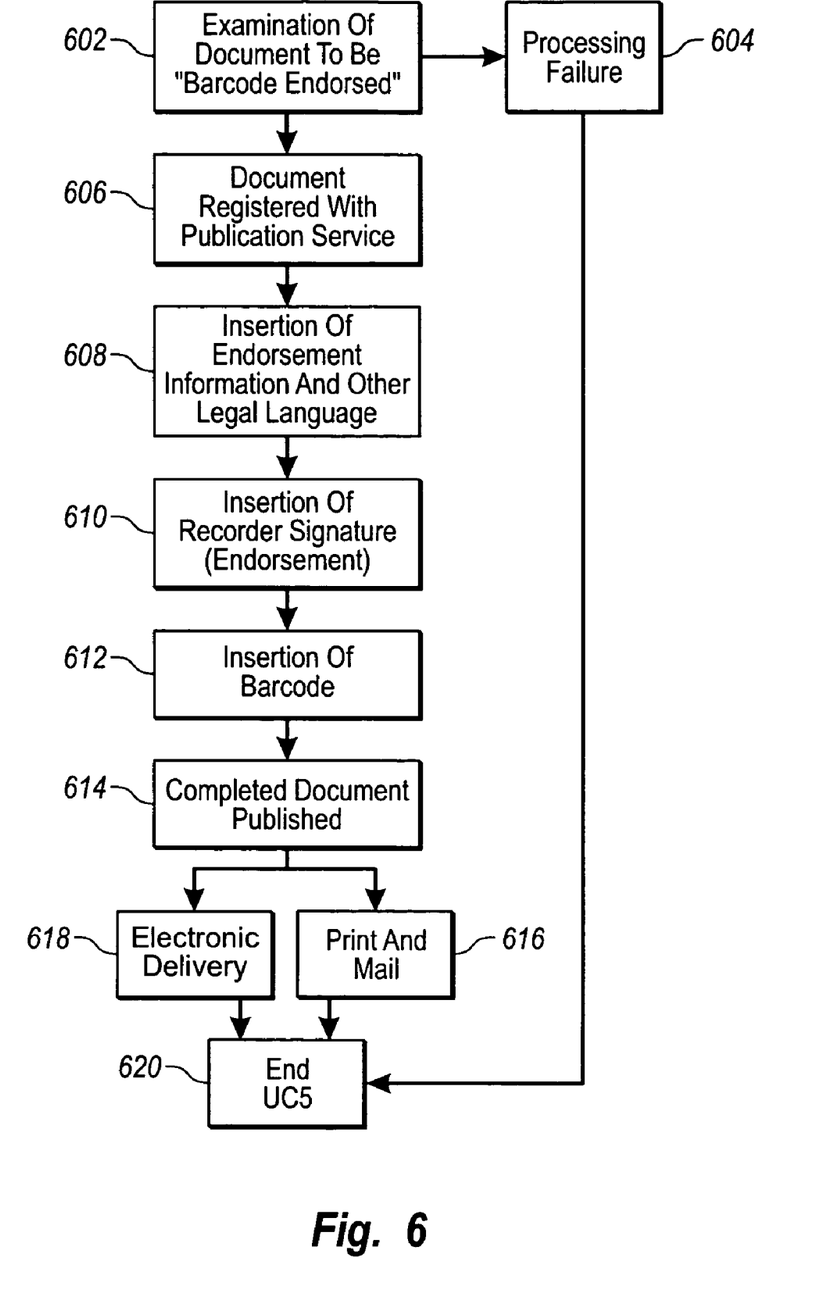
FIG. 6 illustrates a method of endorsing by a recorder of a document.

Referring now to FIG. 6, Use Case 5 is illustrated where a recorder endorses a printed electronic document with a barcode. At 602, the document to be endorsed is examined. A document can be processed through a typical electronic recordation process such as that described in U.S. Pat. No. 6,796, 489, titled PROCESSING ELECTRONIC DOCUMENTS WITH EMBEDDED DIGITAL SIGNATURES, or through any suitable recordation process until the document is ready to be endorsed. A typical recordation process may include validation of the notarization and signatures, whether they are barcode based, electronic signatures with tamper seals, an image and data pair with a tamper seal, a PKI signature, or other signature. Document images and/or XML and HTML are processed up to the endorsement step. If processing fails at 604, the processing of the document ends.

Otherwise, at 606, the document is registered with a publication service which may include a document server. As a result of registering, URLs and/or other addressing information with references directed to a document server location are returned and added to the document. The text may be added by image based processing to overlay the text on the document and/or by embedding text into the document as XML and HTML which may include hyperlinks.

The document may then be processed to add appropriate text to the document associated with the endorsement as shown at 608. Endorsement information may include an entry number, a book, a page, a date of recordation, a time, a fee paid, the recorder's name, the jurisdiction, the instrument type, and the like. The text may be added by image based processing to overlay the text on the document and/or by embedding text into the document as XML and HTML which may include hyperlinks.

As shown at 610, the recorder's signature or endorsement is inserted into the document. In one embodiment, a graphical user interface presents to the endorser a statement that indicates that the endorser agrees that the document is to be electronically endorsed, and that a barcode will be inserted as part of their signature. The statement will further indicate that the barcode will be used to preserve the electronic recordation and/or electronic endorsement when the document is printed or imaged. This is done in a fashion similar to that described at 208 in conjunction with the description of FIG. 2. A signature is embedded into the document in a manner similar to that described at 212 in the description of FIG. 2.

A barcode may now be embedded into the document as shown at 612. Inserting the barcode into the document is done in a fashion similar to that shown at 222 in FIG. 2. However, in this example, the barcode may further contain endorsement data such as the endorsement data described previously herein. The barcode may contain a URL link to recorder specific data about the document, including the endorsement data described previously herein.

At 614, the document is published on a document server and at 616 and 618 the document is delivered. As in previous examples, the document may be printed and mailed, 616 or delivered electronically, 618. At 620, Use Case 5 ends.

Figure 7:
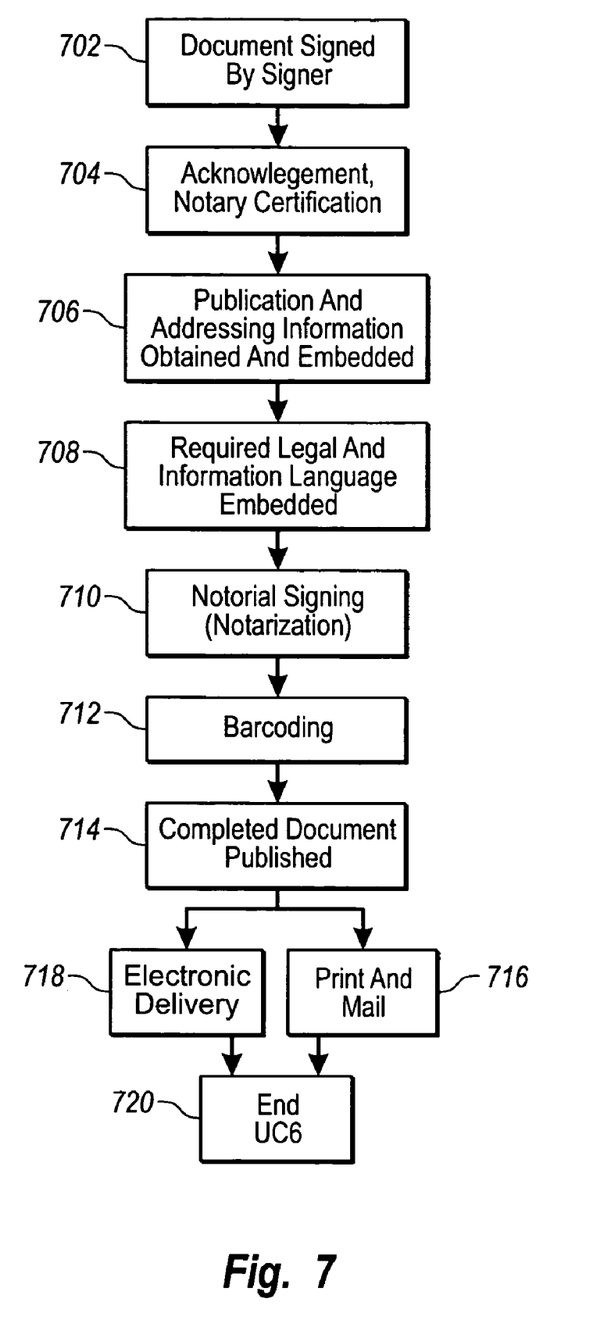
FIG. 7 illustrates a method of notarizing a document.

Referring now to FIG. 7, Use Case 6 is shown, where a barcode is used to notarize a document. At 702, an electronic document is signed by a signer using an accepted electronic signing method that is verifiable by a notary. At 704, acknowledgement and notary certification takes place. The notary validates the signer's signature if the signature is a PKI signature, and receives an acknowledging statement from the signer regarding the authenticity of their signature. Other steps may taken by the notary to ensure that the notarization is legal and binding.

At 706, publication and addressing information is obtained and embedded into the document. This includes, for example, obtaining an URL address referencing a location on a document server where a copy of the document will be stored. As described above at 204 and 206 in FIG. 1, the URL address may be embedded into the document, including embedding as an image, as XML, and/or as HTML as appropriate depending on the type of document.

At 708, legal and informational language may be added to the document. The legal and informational language may include for example, a unique document ID identifying the document, a statement indicating that the document is electronically notarized and that the barcode's purpose is to preserve the electronic notarization when the document is printed or imaged, and the like. As mentioned previously, the information may be embedded as one or more of XML, HTML and/or an image overlay.

At 710, notarization is illustrated. A graphical user interface presented to the notary at signing time includes a statement indicating that they agree that the document is to be electronically notarized, and that a barcode will be inserted as part of the their signature whose purpose is to preserve the electronic notarization when the document is printed or imaged. A signature is embedded using for example, a method as described above at 212 in FIG. 2.

At 712, a barcode is embedded as part of the notarization process. Embedding a barcode may be done in a fashion similar to that described at 222 in FIG. 2. Additionally, notarial commission information and/or a notary seal may be embedded into the barcode which may be used to verify the notarization.

At 714, the document is published at a document server. At 716 and 718, the document is delivered. Delivery of the document may include printing and mailing the document such as is shown at 716, or electronically delivering the document as shown at 718. At 720, Use Case 6 ends.

Figure 8:
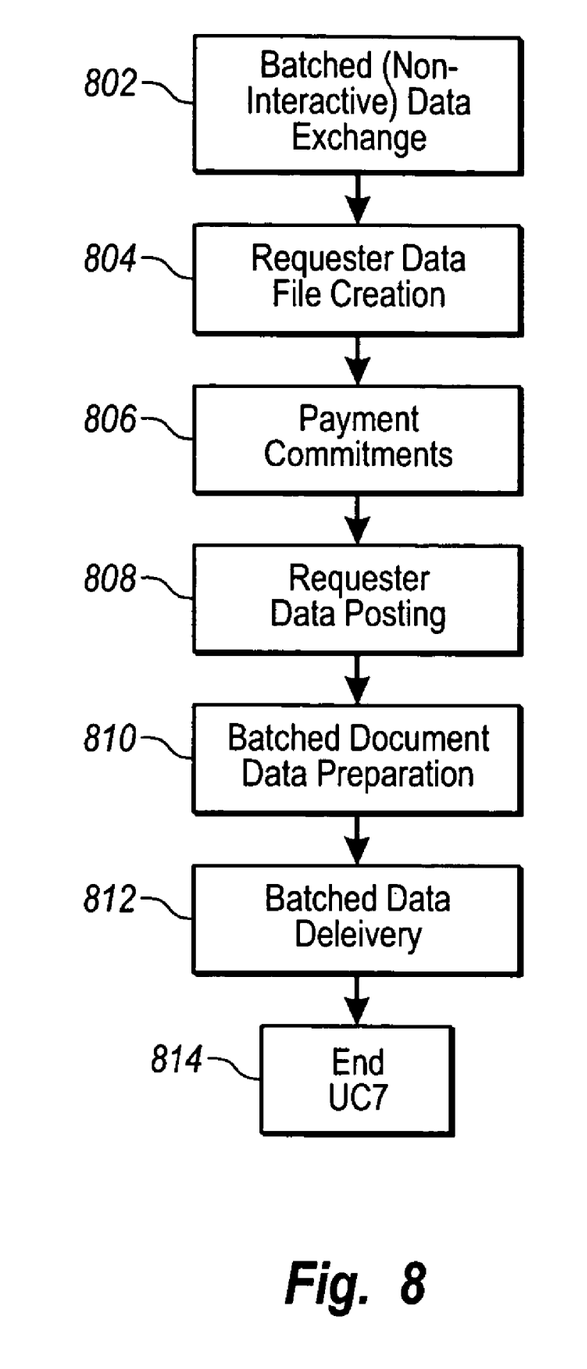
FIG. 8 illustrates a method of retrieving endorsement data.

Referring now to FIG. 8, Use Case 7 is illustrates where querying and paying for endorsement and/or indexing data is shown. At 802, a batched data exchange is shown. Typically, a batched data exchange is not user interactive, but rather an automated process performed between two or more computer systems.

At 804, a requester data file is created. A requester runs a batch to create a batch data file containing references to processed electronic document for which information is desired. In one embodiment, barcodes of paper documents may be scanned to help create the batch data file. At 806, payment commitments are set forth. Proper commitments, payment amounts, payment record IDs and/or "Intent to Pay" documents are included for each document. Alternatively, Proper commitments, payment record IDs and/or "Intent to Pay" documents may be included for the entire batch. At 808, the requester posts data. At this point, the batch data file is posted to a specified publication location on the document server.

At 810, batched document data is prepared. Data about the electronic documents, such as recording information, endorsement information, indexing information, grantor and grantees, etc., is extracted from documents at a service provider such as those on a document server. The information is then queued up for delivery to a requester as a batch. The information may be delivered as a batch to the requester at some pre-specified time or immediately once the batch is prepared.

At 812, the batched data is delivered. The batched data for all properly requested documents may be dumped out to a requester-side location at a pre-specified time. ACH payment is initiated to collect payment for the document services provided. At 814, Use Case 7 ends.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. At a computer system, a computer implemented method of signing an electronic document with legally enforceable electronic signature, the method comprising the acts of:

determining that an electronic document has reached a state appropriate for one or more human signers to electronically sign the document;

registering the electronic document with a document publication service;

receiving a URL from the document publication service, the URL indicating a location of the electronic document at the document publication service so that arbitrary recipients that lack prior knowledge of the electronic document's location can utilize the URL to access the electronic document from the document publication service;

receiving authorization, under the control of a user of the computer system, to electronically sign the electronic document with an electronic signature corresponding to a human signer of the electronic document;

embedding a legally enforceable electronic signature for the human signer into the electronic document, the embedded electronic signature tying the identity of the human signer to the document, wherein the electronic signature comprises:

a barcode, the barcode comprising:
      a scannable representation of the URL;
      a unique document ID identifying the document; and
      a unique signature ID relating to the signer of the document;

receiving an indication that the human signer authorizes paper versions of the electronic document including the digital signature to be accepted as containing a valid signature;

embedding language in the electronic document to indicate that the human signer authorizes paper versions of the electronic document including the digital signature to be accepted as containing a valid signature such that printed copies of the electronic document retain the legal enforceability of the electronic document based on inclusion of the bar code; and publishing the electronic document to the document publication service for electronic storage at the indicated location, the stored version of the electronic document for use in automated and visual comparisons to other versions of the electronic document, including paper versions of the electronic document, during subsequent attempts to determine the legality of the content of the electronic document.

2. The method of claim 1, further comprising embedding language in the electronic document indicating that the electronic document is electronically signed and that the purpose of embedding the barcode in the electronic document is to preserve the electronic signature when the document is printed.

3. The method of claim 1, wherein the barcode is a 2 dimensional barcode.

4. The method of claim 1, wherein the barcode includes a reference certificate.

5. The method of claim 1, wherein embedding language in the electronic document to indicate that the human signer authorizes paper versions of the electronic document including the bar code to be accepted as containing a valid signature comprises embedding language in the electronic document to comply with a legal notice requirement of a statute.

6. The method of claim 1, wherein embedding the URL in the electronic signature protects the URL with a tamper seal giving legally binding status to the indicated location, the legally binding status making the indicated location part of the document.

7. The method of claim 6, wherein the tamper seal comprises an encrypted hash of the document prior to the barcode being added to the document.

8. The method of claim 7, wherein the encrypted hash is calculated using a private system key in a PKI encryption scheme.

9. The method of claim 7, wherein the encrypted hash is calculated using a private signer key in a PKI encryption scheme.

10. The method of claim 6, wherein the document is one or more of an XML and HTML document and wherein the tamper seal is embedded in the document.

11. The method of claim 1, further comprising sending the electronic document to a recipient.

12. The method of claim 11, wherein sending the electronic document to a recipient comprises printing the electronic document.

13. The method of claim 11, wherein sending the electronic document to a recipient comprises sending the electronic document electronically.

14. The method of claim 1, wherein the barcode is hyperlinked as a live link to the document location indicated in the URL.

15. The method of claim 1, further comprising embedding signer role information into the document, the signer role information indicating the capacity in which the human signer is signing the document, the singer role information indicating a capacity selected from among a notary public and a county recorder.

16. The document of claim 15, wherein the document is one or more of an XML and HTML document and wherein signer role is embedded as text in the document.

17. The method of claim 1, further comprising embedding a graphic of a handwritten signature into the document.

18. The method of claim 1, wherein receiving a URL from the document publication service comprises receiving a URL from the document publication in response to registering the document with the document publication service.

19. At a computer system, a computer program product for use in implementing a method for signing an electronic document with a legally enforceable electronic signature the computer program product comprising one or more computerized storage media having stored thereon computer executable instructions that, when executed at a processor, cause the computer system to perform the method including the following:

determine that an electronic document has reached a state appropriate for one or more human signers to electronically sign the document;

register the electronic document with a document publication service;

receive a URL from the document publication service, the UIRL indicating a location of the electronic document at the document publication service so that arbitrary recipients that lack prior knowledge of the electronic document's location can utilize the URL to access electronic document from the document publication service;

receive authorization, under the control of a user of the computer system, to electronically sign the electronic document with an electronic signature corresponding to a human signer of the electronic document;

embed a legally enforceable electronic signature for the human signer into the electronic document, the embedded electronic signature tying the identity of the human signer to the document, wherein the electronic signature comprises:

a barcode, the barcode comprising:
      a scannable representation of the URL;
      a unique document ID identifying the document; and
      a unique signature ID relating to the signer of the document;

receive an indication that the human signer authorizes paper versions of the electronic document including the digital signature to be accepted as containing a valid signature;

embed language in the electronic document to indicate that the human signer authorizes paper versions of the electronic document including the digital signature to be accepted as containing a valid signature such that printed copies of the electronic document retain the legal enforceability of the electronic document based on inclusion of the bar code; and publish the electronic document to the document publication service for electronic storage at the indicated location, the stored version of the electronic document for use in automated and visual comparisons to other versions of the electronic document, including paper versions of the electronic document, during subsequent attempts to determine the legality of the content of the electronic document.

20. At a computer system, a computer implemented method for determining the legality of a document, the method comprising the acts of:

receiving a paper version of a registered electronic document from a document sender, the paper version of the registered electronic document including a bar code representing an electronic signature, the electronic signature tying the identity of a human signer to the registered electronic document, wherein embedded within the barcode is:

a scannable representation of a URL, the URL indicating the location of the registered electronic document electronically stored at a document publication service, embedding the URL within the electronic signature protecting the URL with a tamper seal giving legally binding status to the indicated location, the legally binding status making the indicated location part of the document;

a unique document ID identifying the registered electronic document; and a unique signature ID relating to the signer of the registered electronic document;

reading the contents of the barcode to obtain the URL, the document ID, and the signature ID;

submitting the URL to the document publication service to request the registered electronic document from the document publication service;

electronically accessing an electronic copy of the registered electronic document from the indicated location;

performing one or more of an automated comparison and a visual comparison between the received paper version of the registered electronic document and the electronically accessed copy of the registered electronic document;

determining that the paper version of the registered electronic document is valid based on the results of performing the one or more of an automated comparison and a visual comparison;

accessing embedded language in the paper version of the electronic document, the embedded language indicating that the human signer of the registered electronic document authorizes paper versions of the electronic document including the bar code to be accepted as containing a valid signature such that paper copies of the registered electronic document retain the legal enforceability of the registered electronic document based on inclusion of the bar code; and determining the paper version of the registered electronic document is a legally enforceable document based on the validity determination and the embedded language.

21. The method of claim 20, further comprising:
removing the barcode from the document;
recovering a hash using a public key; and
comparing the recovered hash to a hash value stored in the barcode.

22. The method of claim 20, wherein submitting the URL to request the registered electronic document comprises hand-keying the URL to follow a link to the stored version of the document.

23. The method of claim 20, wherein submitting the URL to request the registered electronic document comprises scanning the barcode with a barcode reader to access the URL.

24. The method of claim 20, wherein submitting the URL to request the registered electronic document comprises using barcode recognition and/or optical character recognition to obtain the URL.

25. The method of claim 20, further comprising:
an act of scanning the paper version of document into a scanned electronic version of the document; and
wherein
performing one or more of an automated comparison and a visual comparison comprises comparing the scanned electronic version of the document side by side to the electronic copy of the registered electronic document on a display device.

26. The method of claim 20, further comprising:
an act of scanning the paper version of document into a scanned electronic version of the document; and
wherein
performing one or more of an automated comparison and a visual comparison comprises overlaying one of the scanned electronic version of the document and the electronic copy of the registered electronic document on the other of the scanned electronic version of the document and the electronic copy of the registered electronic document.

27. The method of claim 20, wherein determining that the paper version of the document is valid comprises producing a confidence rating that the paper version of the document and the electronic copy of the registered electronic document are the same document.

28. The method of claim 27, wherein producing a confidence rating that the paper version of the document and the electronic copy of the registered electronic document are the same document comprise using image comparison algorithms to statistically produce a confidence rating as to the degree of confidence one should have that the paper version of the document and the electronic copy of the registered electronic document are the same document.

29. The method of claim 20, further comprising validating a signature on the document.

30. The method of claim 29, wherein validating a signature comprises validating a tamper seal.

31. The method of claim 29, wherein validating a signature comprises validating a tamper seal in the barcode.

32. The method of claim 20, wherein submitting the URL to request the registered electronic document comprises selecting a live hyperlink on the barcode to submit the URL.

33. At a computer system, a computer program product for implementing a method for determining the legality of a document, the computer program product comprising one or more computerized storage media having stored thereon computer executable instructions that, when executed at a processor, cause the computer system to perform the method including the following:

accessing a scanned version of a registered electronic document from a document sender, the scanned version of the registered electronic document scanned from a paper version of the registered electronic that was received from a document sender, the scanned version of the registered electronic document including a bar code representing an electronic signature, the electronic signature tying the identity of a human signer to the registered electronic document, wherein embedded within the barcode is:
- a representation of a URL, the URL indicating the location of the registered electronic document electronically stored at a document publication service, embedding the URL within the electronic signature protecting the URL with a tamper seal giving legally binding status to the indicated location, the legally binding status making the indicated location part of the document;
- a unique document ID identifying the registered electronic document; and
- a unique signature ID relating to the signer of the registered electronic document;

read the contents of the barcode to obtain the URL, the document ID, and the signature ID;

submit the URL to the document publication service to request the registered electronic document from the document publication service;

electronically access an electronic copy of the registered electronic document from the indicated location;

perform one or more of an automated comparison and a visual comparison between the scanned version of the registered electronic document and the electronically access copy of the registered electronic document;

determine that the scanned version of the registered electronic document is valid based on the results of performing the one or more of an automated comparison and a visual comparison;

access embedded language in the scanned version of the electronic document, the embedded language indicating that the human signer of the registered electronic document authorizes scanned versions of the electronic document including the bar code to be accepted as containing a valid signature such that scanned copies of the registered electronic document retain the legal enforceability of the registered electronic document based on inclusion of the bar code; and determine that the paper version of the registered electronic document is a legally enforceable document based on the validity determination and the embedded language.

* * * * *